(12) United States Patent
Green, Jr.

(10) Patent No.: US 10,792,551 B2
(45) Date of Patent: Oct. 6, 2020

(54) SPACE SAVING DEVICE

(71) Applicant: Robbie Green, Jr., South Elgin, IL (US)

(72) Inventor: Robbie Green, Jr., South Elgin, IL (US)

( * ) Notice: Subject to any disclaimer, the term of this patent is extended or adjusted under 35 U.S.C. 154(b) by 132 days.

(21) Appl. No.: 15/843,671

(22) Filed: Dec. 15, 2017

(65) Prior Publication Data
US 2018/0169503 A1     Jun. 21, 2018

Related U.S. Application Data

(60) Provisional application No. 62/434,485, filed on Dec. 15, 2016.

(51) Int. Cl.
| | | |
|---|---|---|
| *A63B 71/06* | (2006.01) | |
| *G06F 3/02* | (2006.01) | |
| *G06F 3/14* | (2006.01) | |
| *G06K 19/06* | (2006.01) | |

(52) U.S. Cl.
CPC ...... *A63B 71/0697* (2013.01); *A63B 71/0686* (2013.01); *G06F 3/0202* (2013.01); *G06F 3/1423* (2013.01); *G06F 3/1431* (2013.01); *G06K 19/06037* (2013.01); *A63B 71/0619* (2013.01); *A63B 2071/0661* (2013.01); *A63B 2209/08* (2013.01); *A63B 2225/15* (2013.01)

(58) Field of Classification Search
CPC ............ A63B 71/0697; A63B 71/0686; A63B 71/0619; A63B 2071/0661; A63B 2209/08; A63B 2225/15; G06F 3/1423; G06F 3/1431; G06F 3/0202; G06K 19/06037
See application file for complete search history.

(56) References Cited

U.S. PATENT DOCUMENTS

| | | | | | |
|---|---|---|---|---|---|
| 1,516,223 | A | * | 11/1924 | Wadsworth | G04B 37/1486 368/281 |
| 1,802,080 | A | * | 4/1931 | Jandoc | G04B 37/086 368/291 |
| 4,144,568 | A | * | 3/1979 | Hiller | A61B 5/4519 235/105 |
| 4,220,996 | A | * | 9/1980 | Searcy | A63B 71/0686 235/105 |
| 4,283,712 | A | * | 8/1981 | Goody | A63B 24/00 340/321 |

(Continued)

*Primary Examiner* — Nimeshkumar D Patel
*Assistant Examiner* — Tania Courson
(74) *Attorney, Agent, or Firm* — Boudwin Intellectual Property; Daniel Boudwin

(57) ABSTRACT

A space saving device. The space saving device includes a housing having a front side and a rear side. A plurality of display screens are disposed on the front side, each capable of displaying a number corresponding to a workout tracking function, such as a number of repetitions of an exercise. A plurality of controls disposed on the front side can be used to control the output of the displays. A fastener disposed on the rear side and an attached lanyard allow the device to be removably attached to an exercise machine or other object. A grip material is disposed about a perimeter of the housing for facilitating easy handling of the device. The space saving device is configured to be removably attached to an exercise machine in an exercise facility to inform other users of the facility that the machine is currently occupied.

9 Claims, 2 Drawing Sheets

(56) References Cited

U.S. PATENT DOCUMENTS

| | | | |
|---|---|---|---|
| 4,397,566 A * | 8/1983 | Lederrey | G04B 37/0008 368/276 |
| 4,496,148 A * | 1/1985 | Morstain | A63B 24/0021 273/460 |
| 4,525,074 A * | 6/1985 | Murakami | A61B 5/103 340/309.16 |
| 4,630,935 A * | 12/1986 | Zettek | G04G 9/0064 368/28 |
| 4,855,942 A * | 8/1989 | Bianco | A63B 24/00 702/160 |
| 4,926,572 A * | 5/1990 | Holmes | A61J 7/0481 40/448 |
| 5,285,430 A * | 2/1994 | Decker | G04B 37/0058 368/223 |
| 5,357,487 A * | 10/1994 | Coleman, III | A63B 71/0672 368/10 |
| 5,516,334 A | 5/1996 | Easton | |
| 5,754,499 A * | 5/1998 | Lin | G04B 37/0066 368/236 |
| 5,854,774 A * | 12/1998 | Timme | G04F 1/005 368/10 |
| 5,944,633 A | 8/1999 | Wittrock | |
| D437,790 S * | 2/2001 | Isley | D10/31 |
| 6,506,142 B2 | 1/2003 | Itoh et al. | |
| 6,669,600 B2 * | 12/2003 | Warner | A63B 24/0021 482/4 |
| 6,699,138 B1 * | 3/2004 | Lin | A63B 69/3632 473/219 |
| 6,793,607 B2 | 9/2004 | Neil | |
| 6,796,925 B2 * | 9/2004 | Martinez | A63B 24/00 482/1 |
| 6,904,001 B1 * | 6/2005 | Rast | A44B 11/008 368/107 |
| 7,081,809 B1 * | 7/2006 | Mix | A63B 71/0686 2/426 |
| 7,196,619 B2 * | 3/2007 | Perlman | A24F 47/00 131/270 |
| 7,217,197 B2 * | 5/2007 | Park | A63B 15/005 473/221 |
| 7,948,834 B2 * | 5/2011 | Schrock | G07C 1/24 368/110 |
| 7,951,046 B1 * | 5/2011 | Barber, Jr. | A63B 24/0062 482/1 |
| 8,529,409 B1 * | 9/2013 | Lesea-Ames | G06F 19/3481 482/8 |
| RE44,650 E * | 12/2013 | Anderson | A63B 24/00 482/1 |
| 8,747,197 B2 * | 6/2014 | Morris | A63F 13/92 235/1 B |
| 8,784,270 B2 * | 7/2014 | Ashby | A63B 21/005 482/8 |
| 9,030,362 B2 * | 5/2015 | Abe | G04C 10/02 343/718 |
| 9,186,549 B2 * | 11/2015 | Watterson | A63B 24/0062 |
| 9,272,184 B1 * | 3/2016 | James | A63B 24/0062 |
| 9,305,141 B2 * | 4/2016 | Fabrizio | G06F 19/3481 |
| 9,452,318 B2 * | 9/2016 | Rowe | A63B 24/0003 |
| 2007/0121426 A1 * | 5/2007 | Simonian | G04B 19/08 368/100 |
| 2010/0080087 A1 * | 4/2010 | Shupp | G01C 17/00 368/14 |
| 2012/0220429 A1 * | 8/2012 | Yoshida | A63B 71/0686 482/8 |
| 2014/0275812 A1 | 9/2014 | Stivoric et al. | |

* cited by examiner

SPACE SAVING DEVICE

CROSS REFERENCE TO RELATED APPLICATIONS

This application claims the benefit of U.S. Provisional Application No. 62/434,485 filed on Dec. 15, 2016. The above identified patent application is herein incorporated by reference in its entirety to provide continuity of disclosure.

BACKGROUND OF THE INVENTION

The present invention relates to space saving devices. More specifically, the present invention provides a device for saving one's place at an exercise machine that is capable of performing workout tracking functions.

Many individuals enjoy working out at a gym or other type of exercise facility. Such facilities typically provide a large number of machines or workout areas that can be used by any person attending the facility. However, one drawback to exercising at such facilities is that multiple individuals often wish to use the same machine. A user of an exercise machine will sometimes leave the vicinity of the machine for a short time in order to stretch, get a quick drink of water, or the like, and subsequently return to the machine to complete their exercises. If a user walks away from the coveted machine for even a few moments, another patron of the exercise facility may think that the exercise machine is unoccupied and free to use. Unfortunately, this can lead to miscommunication and arguing between the user who just lost their space at the exercise machine and the user who just took that space from them.

Some individuals attempt to use various devices to save their space at an exercise machine. A common solution is to place a water bottle, towel, or other object directly on the machine or in plain view near the machine. However, these items are common in exercise facilities and are often accidentally left at exercise machines by users who are completely finished with the machine. Another user often sees the towel or water bottle and ignores it, occupying the machine anyway, because the user believes the towel or water bottle was simply left by accident and no one is currently using the machine. This can lead to further miscommunications and lost exercise time. It is therefore desirable to provide a space saving device that can be removably secured to an exercise machine, or to an object near the exercise machine, that clearly indicates a person is still currently using the exercise machine.

In light of the devices disclosed in the known art, it is submitted that the present invention substantially diverges in design elements from the known art and consequently it is clear that there is a need in the art for an improvement to existing space saving devices. In this regard the present invention substantially fulfills these needs.

SUMMARY OF THE INVENTION

In view of the foregoing disadvantages inherent in the known types of space saving devices now present in the prior art, the present invention provides a space saving device wherein the same can be utilized for providing convenience for the user when saving their space at a workout machine with a device that also performs workout tracking functions. The present system comprises a housing including a front side and a rear side. A plurality of display screens are disposed on the front side of the housing. A plurality of buttons are disposed on the front side of the housing, wherein each button of the plurality of buttons is in operable communication with one display screen of the plurality of display screens. A fastener is disposed on the rear side of the housing for securing the housing to an exercise machine or other object. A grip material is disposed about the perimeter of the housing. Further, the device includes a microprocessor and a logic stored on a memory which provides the microprocessor with operational instructions. The microprocessor can be configured to provide various workout tracking functions, each of which may be displayed on one of the displays.

One object of the present invention is to provide a space saving device that can be removably attached to an exercise machine in an exercise facility to inform other users of the facility that the machine is currently occupied.

Another object of the present invention is to provide a space saving device that is capable of providing a variety of workout tracking functions.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
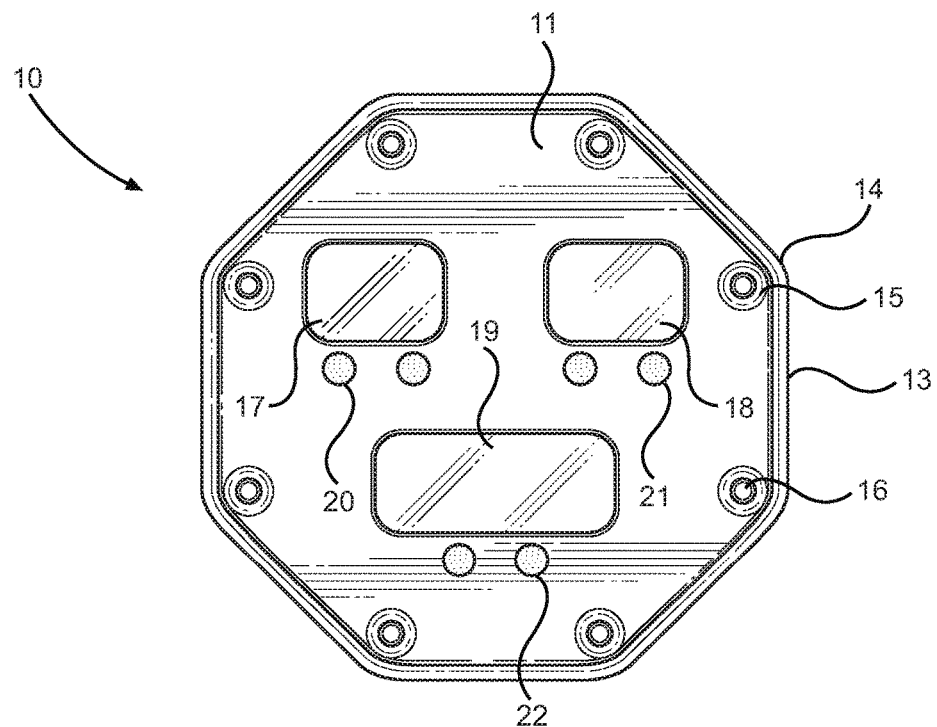
FIG. 1 shows a front elevation view of a space saving device according to the present invention.

Reference is made herein to the attached drawings. Like reference numerals are used throughout the drawings to depict like or similar elements of the space saving device. For the purposes of presenting a brief and clear description of the present invention, the preferred embodiment will be discussed as used for saving a space at a workout machine and providing workout tracking functions. The figures are intended for representative purposes only and should not be considered to be limiting in any respect.

Figure 2:
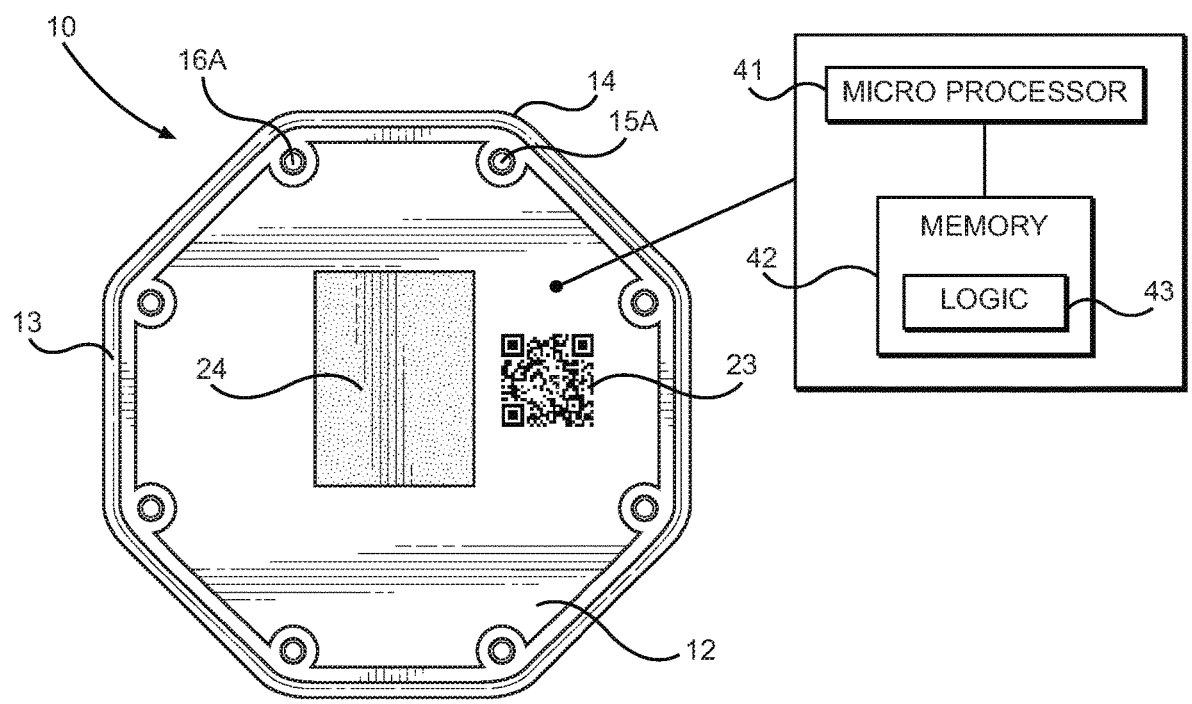
FIG. 2 shows a rear elevation view of a space saving device according to the present invention.

Referring now to FIGS. 1 and 2, there is shown a front elevation view of a space saving device according to the present invention and a rear elevation view of a space saving device according to the present invention, respectively. The space saving device includes a housing 10 having a front side 11 and a rear side 12 that are equally sized such that each is bound by an identical outer perimeter 13. The housing 10 is octagonal in the illustrated embodiment, so as to resemble a stop sign. However, the housing 10 can have a different shape in other embodiments.

In the shown embodiment, the front side 11 includes a first set of apertures 15 and the rear side 12 includes a second set of apertures 15A. A plurality of securement fasteners 16 are inserted through the first and second sets of apertures 15, 15A in order to secure the front side 11 and the rear side 12 of the housing 10 to one another. In the shown embodiment, each aperture of the first and second sets of apertures 15, 15A is disposed such that their edges are coextensive with a vertex 14 of the perimeter 13 to provide structural strength when the rear side 12 is secured to the front side 11. In an alternate embodiment, the housing 10 is integrally formed such that the front side 11 is coextensive with the rear side 12.

A plurality of display screens are disposed on the front side 11 of the housing 10. Each display screen can display a number corresponding to information regarding an exercise, such as the number of repetitions of an exercise, a countdown timer for tracking exercise length, or the like. In the shown embodiment, the device includes a first display 17 and a second display 18 disposed adjacent one another, and a third display 19 positioned beneath the first and second displays 17, 18. In the illustrated embodiment, the third display 19 is larger so that more information can be displayed if desired. The device further includes one or more control buttons operably connected to the displays and configured to control the output of the displays. In the shown embodiment, each display includes one or more control buttons disposed closely thereto for controlling each display. For example, a first group of control buttons 20 is disposed beneath the first display 17, a second group of control buttons 21 is disposed beneath the second display 18, and a third group of control buttons 22 is disposed beneath the third display 19.

The space saving device further includes a microprocessor 41, a memory 42, and a logic 43 stored on the memory. The logic 43 includes instructions for the microprocessor 41, which may include various workout tracking functions. For example, one possible function of the microprocessor 41 is to count repetitions of an exercise and display the current number of repetitions on one of the display screens. The device can receive a first input corresponding to a first repetition of an exercise, via one of the control buttons. The device can then display the first repetition on one of the display screens, where this step can be repeated for each subsequent repetition, allowing users to manually input and keep track of repetitions. The microprocessor 41 can be configured to perform a variety of other workout tracking functions, such as a countdown timer, an interval timer, or the like.

The space saving device further includes a fastener 24 disposed on the rear side of the housing 12. The fastener 24 can be a magnet configured to secure the housing 10 to a magnetically attractive surface. In an alternate embodiment, the fastener 24 may be a clip for securing the housing 10 to an exercise machine or other object.

In the shown embodiment, a scannable QR code 23 is disposed on the rear side 11 of the housing. It is contemplated that a gym or other workout center may have a number of space saving devices of the current invention in active use. The facility may utilize the scannable code to keep track of which of the devices are currently in use by users of the facility, and which of the devices are not currently in use. This allows the facility to keep track of the space saving devices as they are used.

Figure 3:
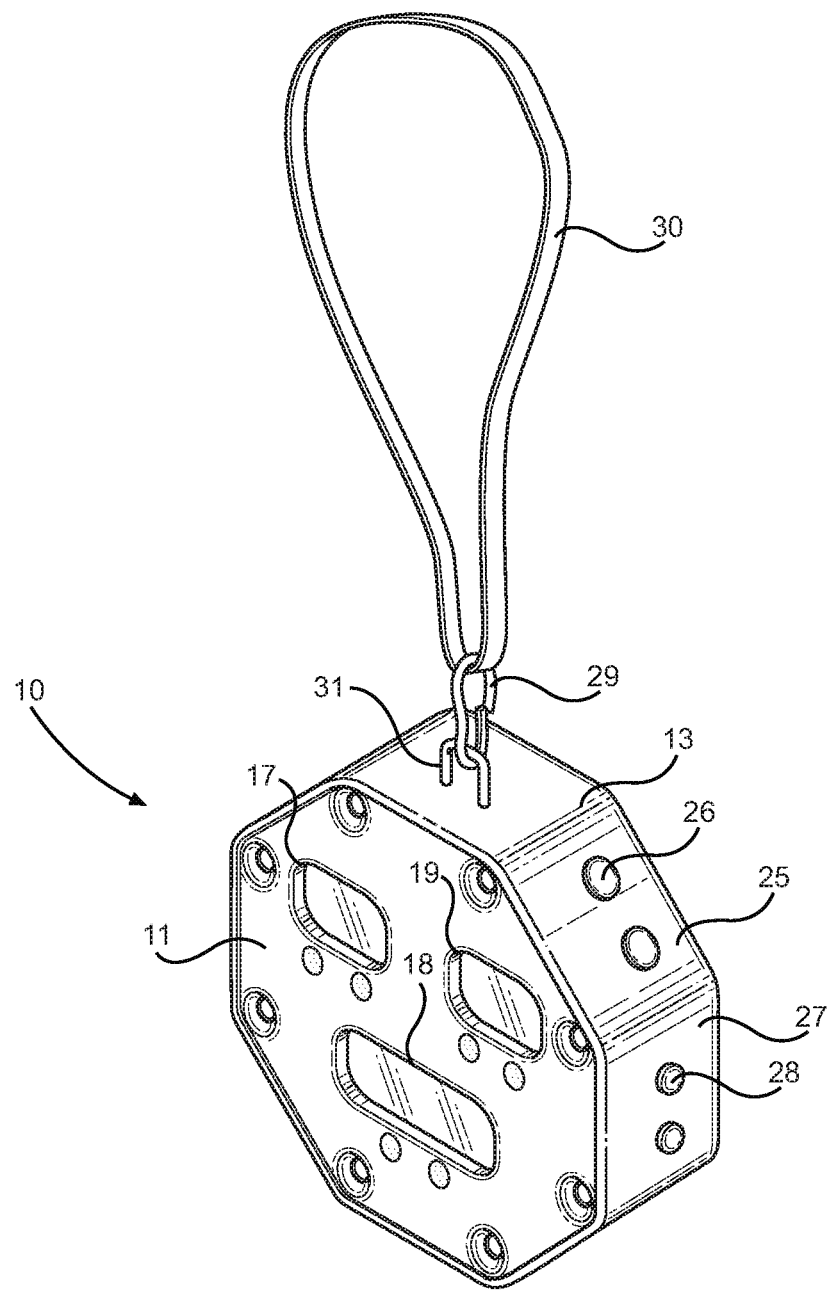
FIG. 3 shows a perspective view of a space saving device according to the present invention.

Referring now to FIG. 3, there is shown a perspective view of a space saving device according to the present invention. In one embodiment of the invention, the outer perimeter 13 can be composed of a grip-enhancing material such as rubber or any other material having a coefficient of friction greater than one, allowing for easy handling of the space saving device. In the shown embodiment, the space saving device further includes a bracket 31 affixed to an upper portion of the outer perimeter 13. A latch 29 is removably secured to the bracket 31, and a lanyard 30 is looped through the latch 29 such that the lanyard 30 is removably secured thereto. The lanyard 30 allows the user to wear the space saving device around their neck while exercising or while moving between exercise stations. Additionally, the lanyard 30 can be utilized as an additional fastener for hanging the space saving device on an exercise machine or an object in close proximity therewith.

The illustrated embodiment shows additional mechanisms for controlling the output of the first, second, and third displays 17, 18, 19. In the shown embodiment, a first group of controls 26 are disposed on a first face 25 of the perimeter 13, and a second group of controls 28 are disposed on a second face 27 of the perimeter 13. This separation of the control buttons prevents users from accidentally hitting the wrong control buttons. These first and second control groups 26, 28 may be operably connected to the first and second display screens 17, 18, respectively. In another embodiment, there can be a third control group disposed on a third face of the perimeter and in operable communication with the third display 19. Some embodiments can include control buttons disposed on both the front side 11 of the housing 10 and the on the perimeter 13 of the housing 10.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A space saving device, comprising:
    a housing including a front side and a rear side;
    a first set of apertures disposed on the front side of the housing;
    a second set of apertures disposed on the rear side of the housing, wherein the first set of apertures align with the second set of apertures, wherein each aperture of the first set of apertures and the second set of apertures is coextensive with a vertex of the perimeter of the housing;
    a plurality of display screens disposed on the front side of the housing;
    a plurality of buttons disposed on the front side of the housing, each button of the plurality of buttons in operable communication with one display screen of the plurality of display screens;
    a fastener disposed on the rear side of the housing;
    a grip material disposed about a perimeter of the housing;
    a microprocessor operably connected to a memory.
2. The space saving device of claim 1, further comprising:
    a logic stored on the memory that, when executed by the microprocessor, causes the space saving device to perform a method, the method comprising:

receiving a first input corresponding to a first repetition of an exercise;

displaying the first input on one of the plurality of display screens;

receiving a second input corresponding to a subsequent repetition of an exercise;

displaying the sum of the first input and the second input on one of the plurality of display screens.

3. The space saving device of claim 1, further comprising a scannable code disposed on a rear side of the housing.

4. The space saving device of claim 1, wherein the fastener comprises a magnet.

5. The space saving device of claim 1, wherein the fastener comprises a clip.

6. The space saving device of claim 1, further comprising:

a plurality of securement fasteners, each securement fastener inserted through one aperture of the first set of apertures and one aperture of the second set of apertures, the plurality of securement fasteners configured to secure the front side of the housing to the rear side of the housing.

7. The space saving device of claim 1, further comprising:

a first group of control buttons disposed on a first face of the perimeter of the housing, the first group of buttons operably connected to a first display screen of the plurality of display screens;

a second group of control buttons disposed on a second face of the perimeter of the housing, the second group of buttons operably connected to a second display screen of the plurality of display screens.

8. The space saving device of claim 1, further comprising a lanyard affixed to the housing.

9. The space saving device of claim 8, wherein the lanyard is removably secured to a latch, wherein the latch is removably secured to a bracket disposed on the perimeter of the housing.

* * * * *